(12) United States Patent
Hwang et al.

(10) Patent No.: US 9,810,290 B2
(45) Date of Patent: Nov. 7, 2017

(54) PLANETARY GEAR TRAIN OF AUTOMATIC TRANSMISSION FOR VEHICLE

(71) Applicant: Hyundai Motor Company, Seoul (KR)

(72) Inventors: Seong Wook Hwang, Gunpo-si (KR); KyeongHun Lee, Seoul (KR); Sueng Ho Lee, Seoul (KR); Kangsoo Seo, Yongin-si (KR); Jae Chang Kook, Hwaseong-si (KR); Dong Hwan Hwang, Seoul (KR); Wookjin Jang, Yongin-si (KR); Myeong Hoon Noh, Seongnam-si (KR); Seongwook Ji, Ansan-si (KR); Wonmin Cho, Hwaseong-si (KR); JongSool Park, Hwaseong-si (KR); Hyu Tae Shim, Hwaseong-si (KR); Chang Wook Lee, Suwoni-si (KR)

(73) Assignee: Hyundai Motor Company, Seoul (KR)

( * ) Notice: Subject to any disclaimer, the term of this patent is extended or adjusted under 35 U.S.C. 154(b) by 105 days.

(21) Appl. No.: 14/918,355

(22) Filed: Oct. 20, 2015

(65) Prior Publication Data

US 2016/0356342 A1 Dec. 8, 2016

(30) Foreign Application Priority Data

Jun. 2, 2015 (KR) .......................... 10-2015-0078004

(51) Int. Cl.
*F16H 3/66* (2006.01)

(52) U.S. Cl.
CPC ....... *F16H 3/66* (2013.01); *F16H 2200/0065* (2013.01); *F16H 2200/2012* (2013.01);
(Continued)

(58) Field of Classification Search
CPC ...... F16H 3/62; F16H 3/66; F16H 2200/0065; F16H 2200/2012; F16H 2200/2046; F16H 2200/2097

See application file for complete search history.

(56) References Cited

U.S. PATENT DOCUMENTS 8,419,587 B2 * 4/2013 Gumpoltsberger ....... F16H 3/66
475/276
2016/0333981 A1 * 11/2016 Hwang ..................... F16H 3/66

FOREIGN PATENT DOCUMENTS

KR 10-2012-0133578 A 12/2012
KR 10-2013-0000173 A 1/2013
(Continued)

*Primary Examiner* — Jacob S Scott
(74) *Attorney, Agent, or Firm* — Morgan Lewis & Bockius LLP

(57) ABSTRACT

A planetary gear train of an automatic transmission for vehicles may include an input shaft receiving torque of an engine, an output shaft outputting changed torque of the engine, a first planetary gear set, a second planetary gear set, a third planetary gear set, a fourth planetary gear set, a first shaft, a second rotation shaft, a third rotation shaft, a fourth rotation shaft selectively connected to the input shaft, a fifth rotation shaft selectively connected to the input shaft or selectively connected to the transmission housing, a sixth rotation shaft directly connected to the output shaft to be continuously operated as an output element, a seventh rotation shaft selectively connected to the transmission housing, an eighth rotation shaft selectively connected to the third rotation shaft, a ninth rotation shaft directly connected to the input shaft to be continuously operated as an input element, and six friction elements.

9 Claims, 2 Drawing Sheets

(52) U.S. Cl.
CPC ................ *F16H 2200/2046* (2013.01); *F16H 2200/2097* (2013.01)

(56) References Cited

FOREIGN PATENT DOCUMENTS

| KR | 10-2014-0040633 A | 4/2014 |
|----|-------------------|--------|
| KR | 10-2014-0101859 A | 8/2014 |

\* cited by examiner

FIG. 2

|    | C1 | C2 | C3 | C4 | B1 | B2 | Gear ratio |
|----|----|----|----|----|----|----|------------|
| D1 |    | ●  | ●  |    |    | ●  | 5.160      |
| D2 | ●  | ●  |    |    |    | ●  | 3.033      |
| D3 | ●  |    | ●  |    |    | ●  | 2.062      |
| D4 |    |    | ●  | ●  |    | ●  | 1.570      |
| D5 | ●  |    | ●  | ●  |    |    | 1.225      |
| D6 | ●  | ●  |    | ●  |    |    | 1.000      |
| D7 |    | ●  | ●  | ●  |    |    | 0.862      |
| D8 |    | ●  |    | ●  | ●  |    | 0.720      |
| D9 |    |    | ●  | ●  | ●  |    | 0.606      |
| REV|    |    | ●  |    | ●  | ●  | -4.518     |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0078004 filed Jun. 2, 2015, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission of a vehicle that improves power delivery performance and reduces fuel consumption by achieving nine forward speed stages using a minimum number of constituent elements.

Description of the Related Art

Recently, increasing oil prices have caused vehicle manufacturers all over the world to rush into infinite competition. Particularly in the case of engines, manufacturers have been pursuing efforts to reduce the weight and improve fuel efficiency of vehicles by reducing engine size, etc.

As a result, research into reduction of weight and enhancement of fuel efficiency through downsizing has been conducted in the case of an engine and research for simultaneously securing operability and fuel efficiency competitiveness through multiple speed stages has been conducted in the case of an automatic transmission.

However, in the automatic transmission, as the number of transmission speed stages increases, the number of internal components also increases, and as a result, the automatic transmission may be difficult to mount, the manufacturing cost and weight may be increased, and power transmission efficiency may be deteriorated.

Accordingly, development of a planetary gear train which may bring about maximum efficiency with a small number of components may be important in order to increase a fuel efficiency enhancement effect through the multiple speed stages.

In this aspect, in recent years, 8- and 9-speed automated transmissions have tended to be achieved and the research and development of a planetary gear train capable of implementing more transmission steps has also been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission of a vehicle having advantages of improving power delivery performance and fuel economy by achieving nine forward speed stages and one reverse speed stage using a minimum number of constituent elements, and of improving silent driving using a driving point positioned at a low engine speed.

According to various aspects of the present invention, a planetary gear train of an automatic transmission for vehicles may include an input shaft receiving torque of an engine, an output shaft outputting changed torque of the engine, a first planetary gear set including a first sun gear, a first planet carrier, and a first ring gear, a second planetary gear set including a second sun gear, a second planet carrier, and a second ring gear, a third planetary gear set including a third sun gear, a third planet carrier, and a third ring gear, a fourth planetary gear set including a fourth sun gear, a fourth planet carrier, and a fourth ring gear, a first shaft including the first sun gear, a second rotation shaft including the first planet carrier and the second ring gear, a third rotation shaft including the first ring gear and the third sun gear, a fourth rotation shaft including the second sun gear and selectively connected to the input shaft, a fifth rotation shaft including the second planet carrier and selectively connected to the input shaft or selectively connected to the transmission housing, a sixth rotation shaft including the third planet carrier and the fourth ring gear and directly connected to the output shaft to be continuously operated as an output element, a seventh rotation shaft including the third ring gear and selectively connected to the transmission housing, an eighth rotation shaft including the fourth sun gear and selectively connected to the third rotation shaft, a ninth rotation shaft including the fourth planet carrier and directly connected to the input shaft to be continuously operated as an input element, and six friction elements disposed to selectively connect the rotation shafts with each other and selectively connect the rotation shafts with the transmission housing.

The first, second, third, and fourth planetary gear sets comprise may be pinion planetary gear sets.

The first, second, third, and fourth planetary gear sets may be disposed sequentially from an engine side.

The six friction elements may include a first clutch interposed between the input shaft and the fifth rotation shaft, a second clutch interposed between the third rotation shaft and the fifth rotation shaft, a third clutch interposed between the input shaft and the fourth rotation shaft, a fourth clutch interposed between the third rotation shaft and the eighth rotation shaft, a first brake interposed between the fifth rotation shaft and the transmission housing, and a second brake interposed between the seventh rotation shaft and the transmission housing.

Shift speed stages achieved by selectively operating the six friction elements may include a first forward speed stage achieved by simultaneous operation of the second and third clutches and the second brake, a second forward speed stage achieved by simultaneous operation of the first and second clutches and the second brake, a third forward speed stage achieved by simultaneous operation of the first and third clutches and the second brake, a fourth forward speed stage achieved by simultaneous operation of the third and fourth clutches and the second brake, a fifth forward speed stage achieved by simultaneous operation of the first, third, and fourth clutches, a sixth forward speed stage achieved by simultaneous operation of the first, second, and fourth clutches, a seventh forward speed stage achieved by simultaneous operation of the second, third, and fourth clutches, an eighth forward speed stage achieved by simultaneous operation of the second and fourth clutches and the first brake, a ninth forward speed stage achieved by simultaneous operation of the third and fourth clutches and the first brake, and a reverse speed stage achieved by simultaneous operation of the third clutch and the first and second brakes.

According to various aspects of the present invention, a planetary gear train of an automatic transmission for a vehicle may include an input shaft receiving torque of an engine, an output shaft outputting changed torque of the engine, a first planetary gear set including a first sun gear, a first planet carrier, and a first ring gear, a second planetary gear set including a second sun gear, a second planet carrier, and a second ring gear, a third planetary gear set including a third sun gear, a third planet carrier, and a third ring gear, a fourth planetary gear set including a fourth sun gear, a fourth planet carrier, and a fourth ring gear, a first clutch selectively connecting the input shaft to the second planet carrier, a second clutch selectively connecting the first ring gear to the second planet carrier, a third clutch selectively connecting the input shaft to the second sun gear, a fourth clutch selectively connecting the third sun gear to the fourth sun gear, a first brake selectively connecting the second planet carrier to the transmission housing, and a second brake selectively connecting the third ring gear to the transmission housing, in which the third planet carrier may be directly connected to the fourth ring gear, the input shaft may be directly connected to the fourth planet carrier, the output shaft may be directly connected to the fourth ring gear, the first planet carrier may be directly connected to the second ring gear, and the first ring gear may be directly connected to the third sun gear.

Various embodiments of the present invention may achieve nine forward speed stages by combining four planetary gear sets which are formed as simple planetary gear sets, with six friction elements. Therefore, power delivery performance and fuel economy may be improved.

Also, silent drivability of vehicle may be improved greatly through the multiple speed stages of the automatic transmission appropriate to the engine rotation speed.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of friction elements at each speed stage in the exemplary planetary gear train according to the present invention.

Figure 1:
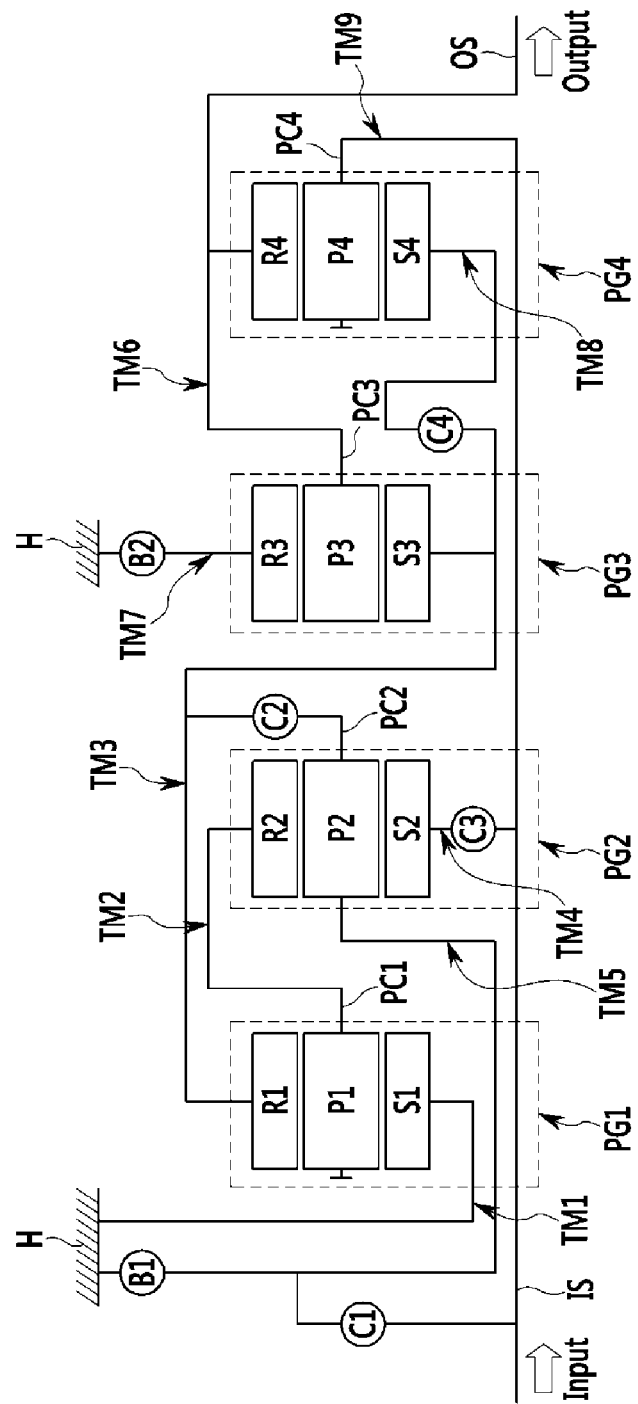
FIG. 1 is a configuration diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a configuration diagram of a planetary gear train according to a first exemplary embodiment of the present invention.

Referring to FIG. 1, the planetary gear train according to various embodiments of the present invention includes first, second, third, and fourth planetary gear sets PG1, PG2, PG3, and PG4 disposed on the same axis, and an input shaft IS, an output shaft OS, nine rotation shafts TM1 to TM9 directly connecting to each other and respective rotation elements of the first, second, third, and fourth planetary gear sets PG1, PG2, PG3, and PG4, six friction elements C1 to C4 and B1 to B2, and a transmission housing H.

As a result, torque input from the input shaft IS is transmitted by an inter-complementation operation of the first, second, third, and fourth planetary gear sets PG1, PG2, PG3, and PG4 to be output through the output shaft OS.

The respective simple planetary gear sets are disposed in a sequence of the first, second, third, and fourth planetary gear sets PG1, PG2, PG3, and PG4 from an engine side.

The input shaft IS is an input member and rotational power from a crankshaft of an engine is torque-converted through a torque converter to be input into the input shaft IS.

The output shaft OS as an output member transfers transmitted driving torque to a driving shaft through a differential apparatus.

The first planetary gear set PG1 as a single-pinion planetary gear set includes a first sun gear S1, a first planetary carrier PC1 that supports a first pinion P1 which outer-engages with the first sun gear S1, and a first ring gear R1 which inner-engages with the first pinion P1 as rotation elements.

The second planetary gear set PG2 as a single-pinion planetary gear set includes a second sun gear S2, a second planetary carrier PC2 that supports a second pinion P2 which outer-engages with the second sun gear S2, and a second ring gear R2 which inner-engages with the second pinion P2.

The third planetary gear set PG3 as a single-pinion planetary gear set includes a third sun gear S3, a third planetary carrier PC3 that supports a third pinion P3 which outer-engages with the third sun gear S3, and a third ring gear R3 which inner-engages with the third pinion P3.

The fourth planetary gear set PG4 as a single-pinion planetary gear set includes a fourth sun gear S4, a fourth planetary carrier PC4 that supports a fourth pinion P4 which outer-engages with the fourth sun gear S4, and a fourth ring gear R4 which inner-engages with the fourth pinion P4.

In the first, second, third, and fourth planetary gear sets PG1, PG2, PG3, and PG4, the first planetary carrier PC1 is directly connected to the second ring gear R2, the first ring gear R1 is directly connected to the third sun gear S3, and the third planetary carrier PC3 is directly connected to the fourth ring gear R4, to operate with a total of nine rotation shafts TM1 to TM9.

Configurations of the nine rotation shafts TM1 to TM9 will be described below.

The first shaft TM1 includes the first sun gear S1, and is directly connected to the transmission housing H.

The second rotation shaft TM2 includes the first planet carrier PC1 and the second ring gear R2.

The third rotation shaft TM3 includes the first ring gear R1 and the third sun gear S3.

The fourth rotation shaft TM4 includes the second sun gear S2, and is selectively connected to the input shaft IS.

The fifth rotation shaft TM5 includes the second planet carrier PC2, is selectively connected to the input shaft IS and the third rotation shaft TM3, and is selectively connected to the transmission housing H.

The sixth rotation shaft TM6 includes the third planet carrier PC3 and the fourth ring gear R4, and is directly connected to the output shaft OS so as to continuously be operated as an output element.

The seventh rotation shaft TM7 includes the third ring gear R3 and is selectively connected to the transmission housing H.

The eighth rotation shaft TM8 includes the fourth sun gear S4 and is selectively connected to the third rotation shaft TM3.

The ninth rotation shaft TM9 includes the fourth planet carrier PC4 and is directly connected to the input shaft IS so as to continuously be operated as an input element.

In addition, among the rotation shaft TM1-TM9, four clutches C1, C2, C3, and C4 which are friction elements are disposed at connection portions where the rotation shafts are connected to each other.

In addition, among the rotational shafts TM1 to TM9, two brakes B1 and B2 which are friction elements are disposed at connection portions between any one rotation shaft and the transmission housing H.

The six frictional elements C1 to C4 and B1 to B2 will be described in further detail.

The first clutch C1 is interposed between the input shaft IS and the fifth rotation shaft TM5, and selectively connects the input shaft IS to the fifth rotation shaft TM5.

The second clutch C2 is interposed between the third rotation shaft TM3 and the fifth rotation shaft TM5, and selectively connects the third rotation shaft TM3 to the fifth rotation shaft TM5.

The third clutch C3 is interposed between the input shaft IS and the fourth rotation shaft TM4, and selectively connects the input shaft IS to the fourth rotation shaft TM4.

The fourth clutch C4 is interposed between the third rotation shaft TM3 and the eighth rotation shaft TM8, and selectively connects the third rotation shaft TM3 to the eighth rotation shaft TM8.

The first brake B1 is interposed between the fifth rotation shaft TM5 and the transmission housing H, and causes the fifth rotation shaft TM5 to be operated as a fixed element.

The second brake B2 is interposed between the seventh rotation shaft TM7 and the transmission housing H, and causes the seventh rotation shaft TM7 to be operated as a fixed element.

The friction elements including the first, second, third, and fourth clutches C1, C2, C3, and C4 and the first and second brakes B1 and B2 may be multi-plate friction elements of a wet type that are operated by hydraulic pressure.

FIG. 2 is an operation chart of friction elements at each speed stage in the planetary gear train according to various embodiments of the present invention.

As shown in FIG. 2, three friction elements are operated at each speed stage in the planetary gear train according to various embodiments of the present invention.

A first forward speed stage D1 is achieved by simultaneous operation of the second and third clutches C2 and C3 and the second brakes B2.

A second forward speed stage D2 is achieved by simultaneous operation of the first and second clutches C1 and S2 and the second brake B2.

A third forward speed stage D3 is achieved by simultaneous operation of the first and third clutches C1 and C3 and the second brake B2.

A fourth forward speed stage D4 is achieved by simultaneous operation of the third and fourth clutches C3 and C4 and the second brake B2.

A fifth forward speed stage D5 is achieved by simultaneous operation of the first, third, and fourth clutches C1, C3, and C4.

A sixth forward speed stage D6 is achieved by simultaneous operation of the first, second, and fourth clutches C1, C2, and C4.

A seventh forward speed stage D7 is achieved by simultaneous operation of the second, third, and fourth clutches C2, C3, and C4.

An eighth forward speed stage D8 is achieved by simultaneous operation of the second and fourth clutches C2 and C4 and the first brake B1.

A ninth forward speed stage D9 is achieved by simultaneous operation of the third and fourth clutch C3 and C4 and the first brake B1.

A reverse speed stage REV is achieved by simultaneous operation of the third clutch C3 and the first and second brakes B1 and B2.

The shifting processes will be described in further detail.

The second and third clutches C2 and C3 and the second brake B2 are simultaneously operated at the first forward speed stage D1. The first forward speed stage D1 is achieved in a state that the third rotation shaft TM3 is connected to the fifth rotation shaft TM5 by operation of the second clutch C2, the input is made into the ninth rotation shaft TM9 and simultaneously is made into the fourth rotation shaft TM4 by operation of the third clutch C3, and the seventh rotation shaft TM7 is operated as the fixed element by operation of the second brake B2.

The first and second clutches C1 and C2 and the second brake B2 are simultaneously operated at the second forward speed stage D2.

The second forward speed stage D2 is achieved in a state that the third rotation shaft TM3 is connected to the fifth rotation shaft TM5 by operation of the second clutch C2, the input is made into the ninth rotation shaft TM9 and simultaneously is made into the fifth rotation shaft TM5 by operation of the first clutch C1, and the seventh rotation shaft TM7 is operated as the fixed elements by operation of the second brake B2.

The first and third clutches C1 and C3 and the second brake B2 are simultaneously operated at the third forward speed stage D3. The third forward speed stage D3 is achieved in a state that the input is made into the ninth rotation shaft TM9 and simultaneously is made into the fourth and fifth rotation shafts TM4 and TM5 by operation of the first and third clutches C1 and C3, and the seventh rotation shaft TM7 is operated as the fixed elements by operation of the second brake B2.

The third and fourth clutches C3 and C4 and the second brake B2 are simultaneously operated at the fourth forward speed stage D4. The fourth forward speed stage D4 is achieved in a state that the third rotation shaft TM3 is connected to the eighth rotation shaft TM8 by operation of the fourth clutch C4, the input is made into the ninth rotation shaft TM9 and simultaneously is made into the fourth rotation shaft TM4 by operation of the third clutch C2, and the seventh rotation shaft TM7 is operated as the fixed elements by operation of the second brake B2.

The first, third, and fourth clutches C1, C3, and C4 are simultaneously operated at the fifth forward speed stage D5. The fifth forward speed stage D5 is achieved in a state that the third rotation shaft TM3 is connected to the eighth rotation shaft TM8 by operation of the fourth clutch C4, and the input is made into the ninth rotation shaft TM9 and simultaneously is made into the fourth and fifth rotation shafts TM4 and TM5 by operation of the first and third clutches C1 and C3.

The first, second, and fourth clutches C1, C2, and C4 are simultaneously operated at the sixth forward speed stage D6. The sixth forward speed stage D6 is achieved. in a state that the third rotation shaft TM3 is connected to the fifth and eighth rotation shafts TM5 and TM8 by operation of the second and fourth clutches C2 and C4, and the input is made into the ninth rotation shaft TM9 and simultaneously is made into the fifth rotation shaft TM5 by operation of the first clutch C1.

The second, third, and fourth clutches C2, C3, and C4 are simultaneously operated at the seventh forward speed stage D7. The seventh forward speed stage D7 is achieved. in a state that the third rotation shaft TM3 is connected to the fifth and eighth rotation shafts TM5 and TM8 by operation of the second and fourth clutches C2 and C4, and the input is made into the ninth rotation shaft TM9 and simultaneously is made into the fourth rotation shaft TM4 by operation of the third clutch C3.

The second and fourth clutches C2 and C4 and the first brake B1 are simultaneously operated at the eighth forward speed stage D8. The eighth forward speed stage D8 is achieved in a state that the third rotation shaft TM3 is connected to the fifth and eighth rotation shafts TM5 and TM8 by operation of the second and fourth clutches C2 and C4, the input is made into the ninth rotation shaft TM9, and the fifth rotation shaft TM5 is operated as the fixed elements by operation of the first brake B1.

The third and fourth clutches C3 and C4 and the first brake B1 are simultaneously operated at the ninth forward speed stage D9. The ninth forward speed stage D9 is achieved in a state that the third rotation shaft TM3 is connected to the eighth rotation shaft TM8 by operation of the fourth clutch C4, the input is made into the ninth rotation shaft TM9 and simultaneously is made into the fourth rotation shaft TM4 by operation of the third clutch C3, and the fifth rotation shaft TM5 is operated as the fixed elements by operation of the first brake B1.

The third clutch C3 and the first and second brakes B1 and B2 are simultaneously operated at the reverse speed stage REV. The reverse speed stage REV is achieved in a state that the fifth and seventh rotation shafts TM5 and TM7 are operated as the fixed elements by operation of the first and second brakes B1 and B2, and the input is made into the ninth rotation shaft TM9 and simultaneously is made into the fourth rotation shaft TM4 by operation of the third clutch C3.

The planetary gear train according to various embodiments of the present invention may achieve nine forward speed stages and one reverse speed stage by control of four planetary gear sets PG1, PG2, PG3, and PG4, four clutches C1, C2, C3, and C4, and two brakes B1 and B2.

The planetary gear train according to various embodiments of the present invention may improve the power transmission efficiency and the fuel efficiency through the multiple speed stages of the automatic transmission.

Since a speed stage suitable to engine speed can be achieved due to multiple speed stages, silent driving may be improved.

In addition, since three friction elements operate at each speed and the number of non-operating friction elements is minimized, a friction drag loss is decreased. Therefore, drag torque and power loss may be reduced.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for vehicles, comprising:
    an input shaft receiving torque of an engine;
    an output shaft outputting changed torque of the engine;
    a first planetary gear set including a first sun gear, a first planet carrier, and a first ring gear;
    a second planetary gear set including a second sun gear, a second planet carrier, and a second ring gear;
    a third planetary gear set including a third sun gear, a third planet carrier, and a third ring gear;
    a fourth planetary gear set including a fourth sun gear, a fourth planet carrier, and a fourth ring gear;
    a first shaft including the first sun gear;
    a second rotation shaft including the first planet carrier and the second ring gear;
    a third rotation shaft including the first ring gear and the third sun gear;
    a fourth rotation shaft including the second sun gear and selectively connected to the input shaft;
    a fifth rotation shaft including the second planet carrier and selectively connected to the input shaft or selectively connected to the transmission housing;
    a sixth rotation shaft including the third planet carrier and the fourth ring gear and directly connected to the output shaft to be continuously operated as an output element;
    a seventh rotation shaft including the third ring gear and selectively connected to the transmission housing;
    an eighth rotation shaft including the fourth sun gear and selectively connected to the third rotation shaft;
    a ninth rotation shaft including the fourth planet carrier and directly connected to the input shaft to be continuously operated as an input element; and
    six friction elements disposed to selectively connect the rotation shafts with each other and selectively connect the rotation shafts with the transmission housing.

2. The planetary gear train of claim 1, wherein the first, second, third, and fourth planetary gear sets comprise single pinion planetary gear sets.

3. The planetary gear train of claim 2, wherein the first, second, third, and fourth planetary gear sets are disposed sequentially from an engine side.

4. The planetary gear train of claim 1, wherein the six friction elements comprise:

a first clutch interposed between the input shaft and the fifth rotation shaft;

a second clutch interposed between the third rotation shaft and the fifth rotation shaft;

a third clutch interposed between the input shaft and the fourth rotation shaft;

a fourth clutch interposed between the third rotation shaft and the eighth rotation shaft;

a first brake interposed between the fifth rotation shaft and the transmission housing; and a second brake interposed between the seventh rotation shaft and the transmission housing.

5. The planetary gear train of claim 4, wherein shift speed stages achieved by selectively operating the six friction elements comprise:

a first forward speed stage achieved by simultaneous operation of the second and third clutches and the second brake;

a second forward speed stage achieved by simultaneous operation of the first and second clutches and the second brake;

a third forward speed stage achieved by simultaneous operation of the first and third clutches and the second brake;

a fourth forward speed stage achieved by simultaneous operation of the third and fourth clutches and the second brake;

a fifth forward speed stage achieved by simultaneous operation of the first, third, and fourth clutches;

a sixth forward speed stage achieved by simultaneous operation of the first, second, and fourth clutches;

a seventh forward speed stage achieved by simultaneous operation of the second, third, and fourth clutches;

an eighth forward speed stage achieved by simultaneous operation of the second and fourth clutches and the first brake;

a ninth forward speed stage achieved by simultaneous operation of the third and fourth clutches and the first brake; and a reverse speed stage achieved by simultaneous operation of the third clutch and the first and second brakes.

6. A planetary gear train of an automatic transmission for a vehicle, comprising:

an input shaft receiving torque of an engine;

an output shaft outputting changed torque of the engine;

a first planetary gear set including a first sun gear, a first planet carrier, and a first ring gear;

a second planetary gear set including a second sun gear, a second planet carrier, and a second ring gear;

a third planetary gear set including a third sun gear, a third planet carrier, and a third ring gear;

a fourth planetary gear set including a fourth sun gear, a fourth planet carrier, and a fourth ring gear;

a first clutch selectively connecting the input shaft to the second planet carrier;

a second clutch selectively connecting the first ring gear to the second planet carrier;

a third clutch selectively connecting the input shaft to the second sun gear;

a fourth clutch selectively connecting the third sun gear to the fourth sun gear;

a first brake selectively connecting the second planet carrier to the transmission housing; and a second brake selectively connecting the third ring gear to the transmission housing, wherein the third planet carrier is directly connected to the fourth ring gear, the input shaft is directly connected to the fourth planet carrier, the output shaft is directly connected to the fourth ring gear, the first planet carrier is directly connected to the second ring gear, and the first ring gear is directly connected to the third sun gear.

7. The planetary gear train of claim 6, wherein the first, second, third, and fourth planetary gear sets comprise single pinion planetary gear sets.

8. The planetary gear train of claim 6, wherein the first, second, third, and fourth planetary gear sets are disposed sequentially from an engine side.

9. The planetary gear train of claim 6, wherein shift speed stages achieved by selectively operating the first, second, third, and fourth clutches and the first and second brakes comprise:

a first forward speed stage achieved by simultaneous operation of the second and third clutches and the second brake;

a second forward speed stage achieved by simultaneous operation of the first and second clutches and the second brake;

a third forward speed stage achieved by simultaneous operation of the first and third clutches and the second brake;

a fourth forward speed stage achieved by simultaneous operation of the third and fourth clutches and the second brake;

a fifth forward speed stage achieved by simultaneous operation of the first, third, and fourth clutches;

a sixth forward speed stage achieved by simultaneous operation of the first, second, and fourth clutches;

a seventh forward speed stage achieved by simultaneous operation of the second, third, and fourth clutches;

an eighth forward speed stage achieved by simultaneous operation of the second and fourth clutches and the first brake;

a ninth forward speed stage achieved by simultaneous operation of the third and fourth clutches and the first brake; and a reverse speed stage achieved by simultaneous operation of the third clutch and the first and second brakes.

* * * * *